Feb. 2, 1965 M. E. CLYNES 3,168,721

INFORMATION TRANSFER SYSTEMS

Filed July 27, 1959 4 Sheets-Sheet 1

INVENTOR.
MANFRED E. CLYNES

BY

ATTORNEY

INVENTOR.
MANFRED E. CLYNES
BY [signature]
ATTORNEY

Feb. 2, 1965 M. E. CLYNES 3,168,721

INFORMATION TRANSFER SYSTEMS

Filed July 27, 1959 4 Sheets-Sheet 3

INVENTOR.
MANFRED E. CLYNES
BY *Philip E. Hilbert*
ATTORNEY

Feb. 2, 1965 M. E. CLYNES 3,168,721

INFORMATION TRANSFER SYSTEMS

Filed July 27, 1959 4 Sheets-Sheet 4

INVENTOR.
MANFRED E. CLYNES

BY Philip G. Hilbert

ATTORNEY

United States Patent Office 3,168,721

Patented Feb. 2, 1965

3,168,721

INFORMATION TRANSFER SYSTEMS

Manfred E. Clynes, Orangeburg, N.Y., assignor, by mesne assignments, to Technical Measurement Corporation, North Haven, Conn., a corporation of Delaware Filed July 27, 1959, Ser. No. 829,694

17 Claims. (Cl. 340—167)

This invention relates to information transfer systems and, more particularly, concerns systems which transfer information as signals of extremely low frequencies which extend to the D.C. range.

Although there are information transfer systems which may adequately transfer information as signals extending into the D.C. range, some systems such as those which include magnetic tape recorders, do not readily lend themselves to transferring such signals. Magnetic recording systems require a time rate of change of magnetization to produce a signal during reproduction. Therefore, if the recorded signal is constant, there is no rate of change of magnetization and consequently, no signal can be reproduced. Due to this phenomenon, conventional magnetic tape recorders, although they can reproduce signals having frequencies in the kilocycle range, are unable to reproduce signals having frequencies much lower than thirty cycles.

To reproduce signals down into the D.C. range, complicated systems have been suggested. One system employs modulation techniques. In particular, a high frequency carrier signal is frequency modulated by the signal representing the information. To insure good linearity, it is necessary that the frequency deviation be kept to less than about 8%. Consequently, to provide a substantially noise free system, highly accurate, wow-free tape transport mechanism are mandatory. Also, elaborate filtering is required in the electronic circuits to obtain a truly linear D.C. response from the sinusoidally varying carrier signal. Such filtering circuits are extremely complex and require modification when the playback speed is changed.

It is accordingly a general object of one embodiment of the invention, to provide an improved information transfer system. Another object of this embodiment of the invention is to provide an information transfer system wherein the output waveforms are either proportional to or identical with, the input waveforms.

A further object of said embodiment of the invention is to provide an improved information transfer system which can handle information in the form of signals having frequencies extending through the low frequency range to the D.C. extreme.

Yet another object of said embodiment of the invention is to provide an improved information transfer system for handling signals that extend to the D.C. extreme, which may be used with conventional, simple magnetic tape recorders.

Briefly, in accordance with said embodiment of the invention, the system includes pulse generating means which generates pulses having a repetition rate related to the amplitude of the signals representing the information. The pulse generating means feeds a pulse shaping means which standardizes the shape and amplitude of the pulses supplied by the pulse generating means. The standardized pulses are supplied to a utilization means such as a tape recorder for subsequent reproduction.

In another embodiment of the invention, the reproducing portion of the magnetic tape recorder is selectively coupled to the pulse shaping means which feeds signals to a utilization means. The utilization means converts the input to signals having amplitudes related to the repetition rate of the reproduced pulses.

In further embodiments of the invention, first and second signal sources respectively transmit signals to first and second pulse generating means which generate pulses of substantially constant duration and having repetition rates related to the amplitudes of the signals received from the respective signal sources. A first pulse shaping means receives the pulses from the first pulse generating means and transmits the received pulses as pulses of a first polarity with a standard duration and amplitude. Similarly, the second pulse shaping means transmits pulses of a second polarity with a different standard duration and amplitude. A mixing means mixes the pulses from the two pulse shaping means to permit their transmission over a single channel to a utilization means such as a magnetic tape recorder.

With such a tape recorder, the reproduction section thereof feeds first and second signal separation means. The first separation means only transmits the first polarity signals and the second separation means only transmits the second polarity signals. The separated signals are then selectively fed to the first and second pulse shaping means for standardization. The standardized pulses are respectively fed to first and second utilization means which convert them to signals having amplitudes related to the pulse repetition rates of the pulses received from the tape recorder via the first and second pulse shaping means.

Other objects of this invention will in part be obvious and in part hereinafter pointed out.

Figure 1:
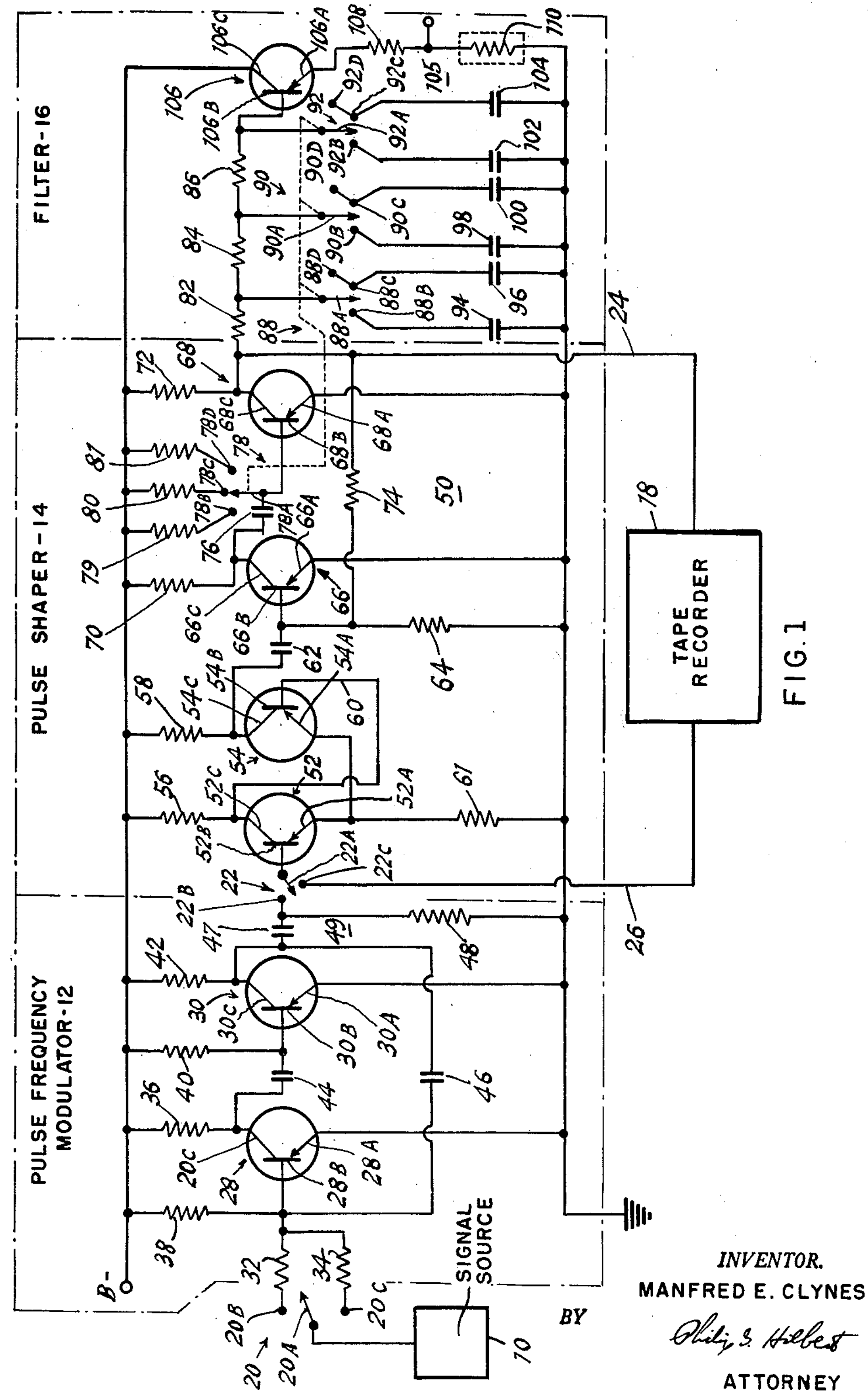
FIG. 1 is a schematic diagram of an information transfer system in accordance with one embodiment of the invention.

Referring to FIG. 1, an information transfer system is shown comprising a signal source 10, pulse generating means or pulse frequency modulator 12, pulse shaping means 14, utilization means or filter 16 and a tape recorder 18, which is preferably of the magnetic type having recording and reproducing sections. Information represented by signals having different amplitudes is transmitted via switch 20 to pulse frequency modulator 12. Modulator 12, hereinafter more fully described, transmits pulses of substantially constant duration but having a repetition rate which is related to the amplitude of the received signals.

The pulses from modulator 12 are selectively fed, via switch 22 to pulse shaper 14. Pulse shaper 14, hereinafter more fully described, transmits a pulse of standard amplitude, shape and duration, for each pulse it receives. The received pulses can be considerably misshapen, yet pulse shaper 14 will transmit standard pulses. The standardized pulses will have the repetition rate of the received pulses. The standardized pulses are fed to filter 16 and via line 24 to the recording section of tape recorder 18. Recorder 18 may be of the conventional single or multi-speed, magnetic tape type.

Tape recorder 18 has a recording section for recording received pulses on a channel of magnetic tape, and a reproducing section for playing back at a later time, the pulses recorded on the magnetic tape. The reproduction section is coupled via the line 26 to switch 22 for selective connection to pulse shaper 14. Filter 16, hereinafter more fully described, is a means for generating signals having amplitudes related to the repetition rate of the standardized pulses transmitted by pulse shaper 14.

During operation, signal source 10 transmits signals which may vary in amplitude at an exceedingly slow rate, or may transmit direct current signals of different amplitudes. These signals control the repetition rate of the pulses generated by pulse frequency modulator 12. Thus, the greater the amplitude of the received signals, the greater the repetition rate of the generated pulses. With movable switch contact 22A in engagement with fixed switch contact 22B, the pulses from modulator 12 are received by pulse shaper 14 for standardization. It is noted that the standardized pulses have the same repetition rate as the received pulses. The standardized pulses are fed to the recording section of tape recorder 18. Such pulses are also fed to filter 16 so that the recording may be monitored.

When it is desired to playback the pulses recorded on the magnetic tape of recorder 18, the movable switch contact 22A is engaged with fixed switch contact 22C and the playback mechanism of recorder 18 is activated. The reproduced pulses are fed via line 26 and switch 22 to pulse shaper 14. It is noted that although these playback pulses may have lost some of their shape, they can still trigger the pulse shaper 14 which transmits a standardized pulse for each pulse received.

The standardized pulses have the same repetition rate as the reproduced pulses. Therefore, if the recording and reproducing speeds are the same, the standardized pulses now transmitted by pulse shaper 14, are exact relicas of the standardized pulses that were originally recorded. If the recording and reproducing speeds of the tape recorder are different, the pulses will be identical except for the repetition rate. It is noted that even in this case, the standardized reproduced pulses will have the same duration as the originally standardized recorded pulses.

In any event, the standardized reproduced pulses are fed to filter 16, where they are converted to signals having amplitudes related to their repetition rates. These signals may be used to energize devices such as a conventional pen recorder, oscilloscope or other visual recording device.

More particularly, pulse frequency modulator 12 is an astable asymmetrical multivibrator having about a 15% duty cycle, and comprises transistors 28, 30. Transistor emitter 28A is connected to ground while base 28B is connected via resistor 32 to fixed switch contact 20B, via resistor 34 to fixed switch contact 20C and via resistor 38 to a potential source B—; and collector 28C is coupled via resistor 36 to said potential source.

Transistor emitter 30A is grounded while base 30B is coupled via resistor 40 to potential source B—; and collector 30C is coupled via resistor 42 to said potential source. Capacitors 44, 46 respectively couple transistor collector 28C to base 30B and transistor collector 30C to base 28B. It is noted that the potential on base 28B determines the free running period of the astable multivibrator. This potential is controlled by the signals fed from signal source 10 via the resistors 32 or 34. Furthermore, the control is only related to the duration of the "off" state of the asymmetrical multivibrator. The "on" state of duration is substantially constant.

It is noted that to obtain optimum frequency response for a recording speed, it is desirable to choose the basic pulse repetition rate in accordance with the recording speed. This may be accomplished by changing the magnitude of capacitors 44, 46 in a fixed ratio. Resistor 38, the ratio of capacitors 44, 46, and the ratio of resistors 36, 40 determines the basic or no signal input duty cycle.

Capacitor 47 couples collector 30C to fixed switch contact 22B, which is also coupled to ground via resistor 48. Pulse shaper 14 comprises the trigger circuit 49 and the monostable multivibrator 50.

Trigger circuit 49, which is a conventional Schmitt trigger, has the property of assuming a first stable state when the potential at its input exceeds a first value, and of assuming a second stable state when the input potential is of a smaller amplitude. The transistion between these stable states is extremely sharp and precise. Monostable multivibrator 50, of conventional type, has the property of resting in a stable state until triggered. On triggering it transmits a pulse of predetermined duration and amplitude.

More particularly, trigger circuit 49 includes transistors 52, 54. Collector 52C of transistor 52 is coupled via resistor 56 to potential source B—, while its base 52B is connected to movable switch contact 22A. Collector 54C of transistor 54 is connected via resistor 58 to potential source B—. Base 54B of transistor 54 is connected via lead 60 to transistor collector 54C. The emitters 52A and 54A are coupled via common resistor 61 to ground. The coupling network comprises capacitor 62 and resistor 64, which couples trigger circuit 49 to monostable vibrator 50.

Monostable multivibrator 50 comprises transistors 66, 68. The collector 66C of transistor 66 is coupled via resistor 70 to potential source B—, while the emitter 66A is connected to ground. Similarly, collector 68C of transistor 68 is coupled via resistor 72 to potential source B—, while emitter 68A is connected to ground potential. Resistor 74 couples collector 68C to base 66B, which receives trigger pulses via capacitor 62. Capacitor 76 couples collector 66C to base 68B. Movable contact 78A of switch 78 is also coupled to base 68B. The fixed contacts 78B, 78C and 78D are respectively coupled via resistors 79, 80 and 81 to potential source B—.

Capacitor 76 and resistors 79, 80, 81 form the timing network for monostable multivibrator 50. Said resistors permit a change of pulse duration in accordance with different playback speeds so that the same duty cycle is maintained with possible overlap of playback pulses at faster playback speeds. Emitter 68C, which is the output of pulse shaper 14, is coupled via line 24, to tape recorder 18 and to filter 16.

Filter 16 comprises a plurality of filter sections which couple pulse shaper 14 to an emitter follower amplifier. Such a combination is capable of converting the pulse train from pulse shaper 14 to a signal having an amplitude related to the repetition rate of the train of pulses.

In particular, filter 16 includes the serially disposed resistors 82, 84, 86, with one end of resistor 82 connected to transistor collector 68C. The movable contact 88A of switch 88 is coupled to the junction of resistors 82, 84; movable contact 90A of switch 90 is coupled to the junction of resistors 84, 86; and movable contact 92A of switch 92 is coupled to the free end of resistor 86.

Capacitor 94 couples fixed switch contact 88B to ground and capacitor 96 couples the other fixed switch contacts 88C, 88D to ground. Similarly, capacitors 98, 100 respectively couple fixed switch contact 90B and fixed switch contacts 90C, 90D, to ground. Also, capacitors 102, 104 respectively couple fixed switch contact 92B and fixed switch contacts 92C, 92D, to ground.

Emitter follower amplifier 105, which is responsive to the above described filter network, comprises transistor 106 whose collector 106C is connected to potential source B—, whose base 106B is connected to resistor 86 and whose emitter 106A is coupled via the serially disposed resistor 108 and thyrite 110 to ground. The output of filter 16 is the juncture of resistor 108 and thyrite 110.

It will be recalled that the pulse train fed to filter 16 comprises pulses of constant duration and amplitude with a repetition rate that varies. In effect, the duty cycle varies and accordingly, the average component of voltage similarly varies. The role of the resistance-capacitance stages in filter 16 is to pass this average component of voltage and to filter out the varying components of the voltage.

Thyrite 110 in the emitter circuit of the emitter follower amplifier 105 further linearizes the output signal since pulse repetition rate changes are not precisely linear with changes of input signal. Furthermore, there may be vary slight changes in the amplitude and width of the pulses from the monostable multivibrator 50 with changes in the pulse repetition rate.

The movable switch contacts of switches 22, 78, 88, 90 and 92 are ganged together so that the proper time constants are provided for each operation of the device. When the switches are in the recording position, the movable contacts engage the B fixed contacts of the respective switches, to cause the pulse shaper 14 to receive signals from modulator 12; the multivibrator 50 generates pulses of proper width; and the appropriate filter capacitors are switched into filter 16.

Similarly, when the movable contacts engage the C fixed contacts of the respective switches, pulse shaper 14 is coupled to tape recorder 18, the required resistor is coupled into the timing circuit of multivibrator 50 and the appropriate capacitors are connected into filter 16. If playback is to be at four times recording speed, then the movable contacts engage the D fixed contacts of the respective switches and the time constant of the multivibrator 50 is quartered.

By combining elements similar to those of FIG. 1, it is possible to provide an information transfer system which receives signals from two sources, combines pulses representing these signals, transfers the pulses over a single transmission channel, and separates the pulses at the other end of the channel where they are reconverted to signals before transfer to utilization devices.

Figure 2:
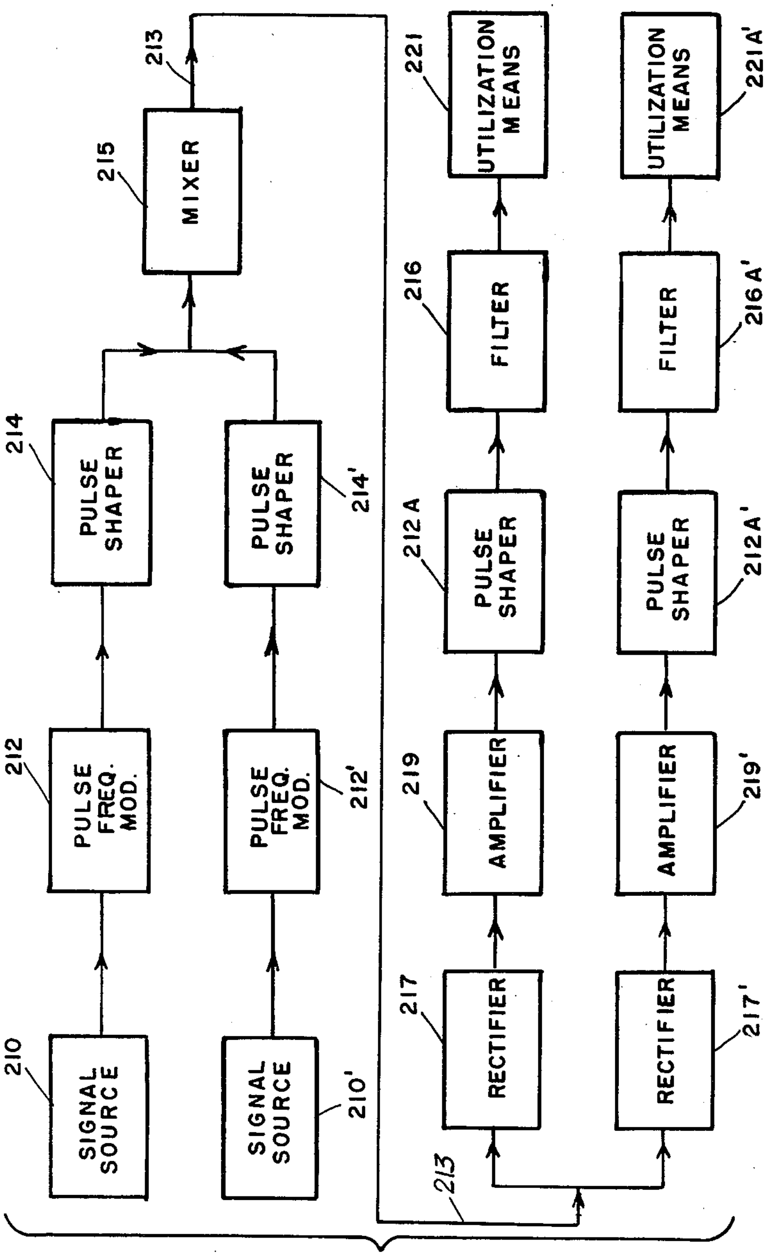
FIG. 2 is a block diagram of an alternate embodiment of the invention wherein two different kinds of information represented by signals are transferred over a single channel.

Such a system is shown in FIG. 2, where elements corresponding to elements indicated in FIG. 1, have reference numbers increased by 200, and only the differences will be described. Signal sources 210, 210′ transmit signals having amplitudes related to the information to be transferred. The information is in general, different for each signal source. Pulse frequency modulators 212, 212′ are similar to modulator 12 except that the time of duration of the pulses generated by modulator 212 is N times longer.

Pulse shapers 214, 214′ receive the pulses and transmit standardized pulses in the manner described in connection with pulse shaper 14, except that the amplitude of the standardized pulses from pulse shaper 214 have 1/Nth the amplitude of the pulses from pulse shaper 14 and the pulses transmitted by pulse shaper 214′ have an opposite polarity, see the waveforms A, B of FIG. 5. The inverted waveforms are readily obtainable by taking the output from collector 66C, instead of collector 68C in multivibrator 50 of FIG. 1.

Figure 4:
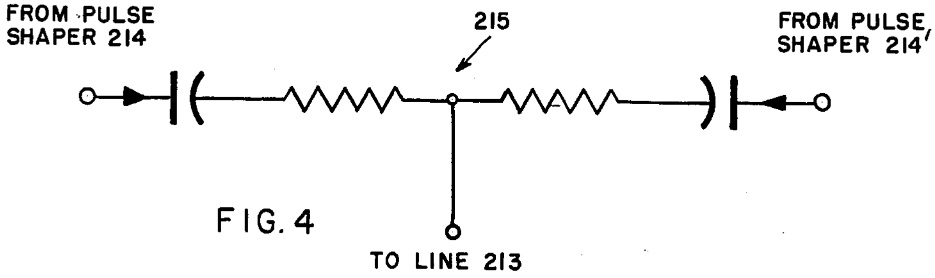
FIG. 4 is a schematic diagram of a mixer that may be used in the system of FIG. 2 or 3.
Figure 5:
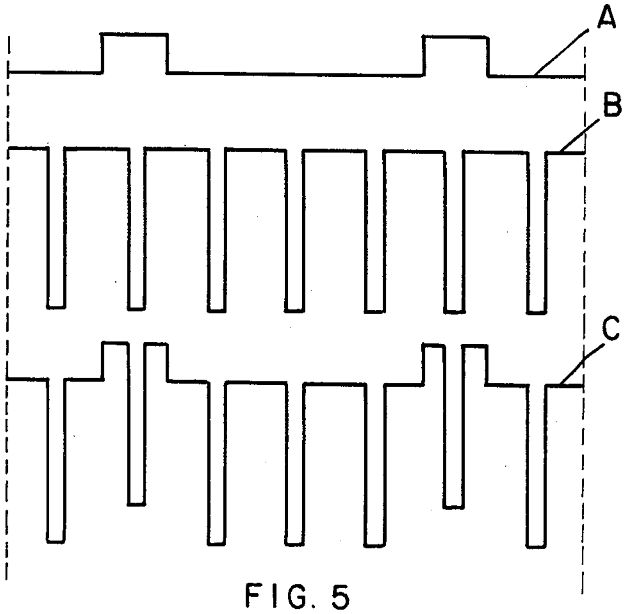
FIG. 5 is a representation of waveforms for signals received and transmitted by the mixer of FIG. 4.

In any event, the standardized pulses are combined in mixer 215, which is shown in detail in FIG. 4, as a conventional combining circuit, to produce the waveform C of FIG. 5. It is noted that because of the relative amplitudes and durations of the mixed standardized pulses are different, there is no chance of mutual cancellation when pulses of opposite polarity coincide.

Mixer 215 feed line 213, which may be any standard communications link. Rectifiers 217, 217′ receive the mixed standardized pulses. Said rectifiers, which may be of conventional diode type, are oppositely polarized to permit separation of the positive and negative pulses.

Positive pulses are fed to amplifier 219 for amplification while the negative pulses are fed to amplifier 219′ for amplification and inversion. It is noted that the gain of amplifier 219 is approximately N times the gain of amplifier 219′. Amplifiers 219, 219′ respectively feed pulse shapers 212A, 212A′. Pulse shapers 212A, 212A′ are identical with pulse shapers 212, 212′ respectively. Thus, the pulses transmitted by shapers 212A, 212A′ are identical to the pulses transmitted by shapers 212, 212′.

Filters 216, 216′, which are the same as filter 16 of FIG. 1, respectively receive the pulses transmitted by shapers 212A, 212A′ and convert these pulses to signals having amplitudes related to the respective pulse repetition rates. The signals are transmitted by filters 216, 216′ respectively to utilization means 221, 221A′, which may be conventional pen recorders.

Figure 3:
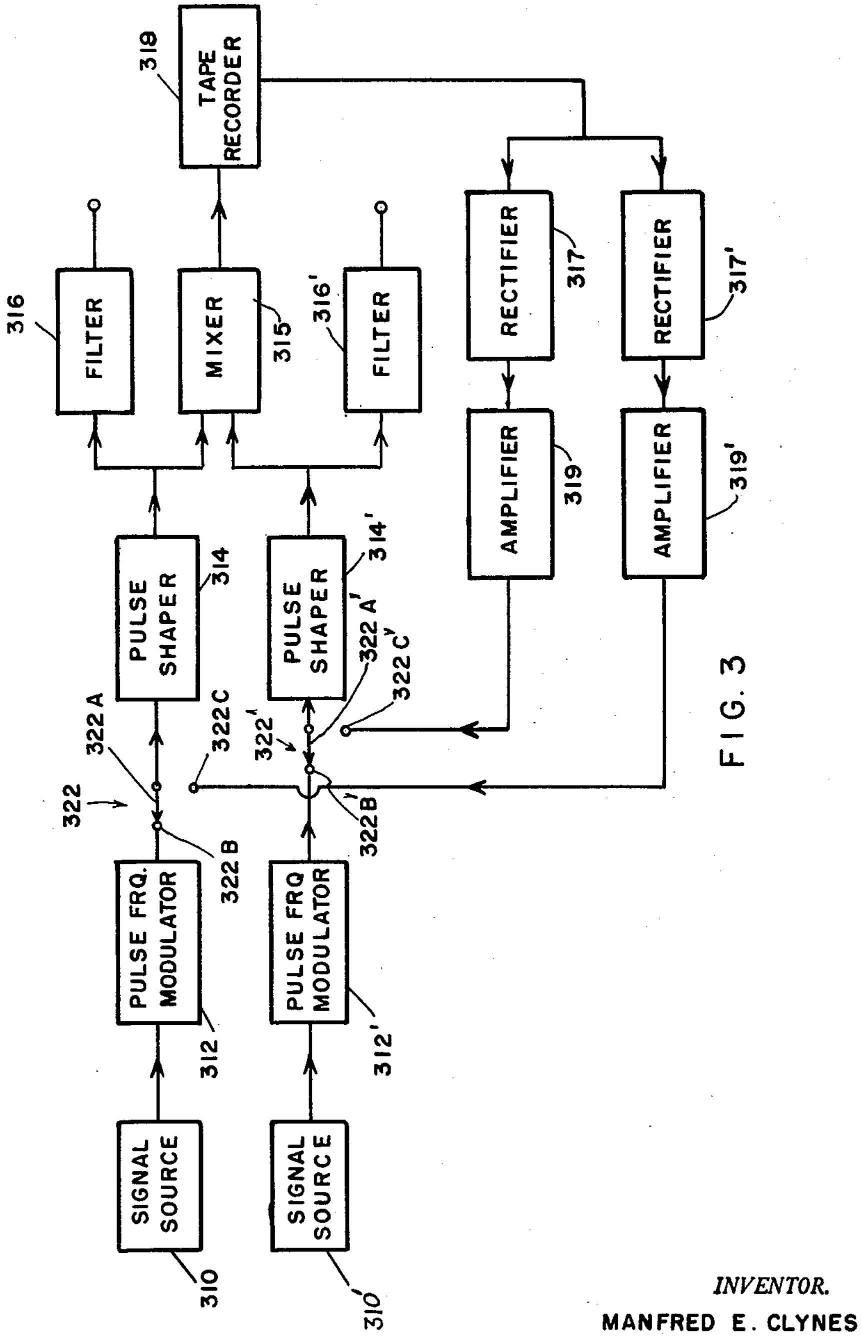
FIG. 3 is a block diagram of an alternate embodiment of the system shown in FIG. 2, wherein the single channel is a magnetic tape recorder.

Although the information transfer system is shown with a communications link, it may also be used with a magnetic storage device such as a tape recorder which serves as storage means for the information before it is transmitted to utilization devices. Such a system is shown in FIG. 3 which includes elements similar to those employed in FIGS. 1, 2. Accordingly, similar elements will be given reference numerals increased by 300 and only the differences will be pointed out.

Signal sources 310, 310′ respectively transmit to pulse frequency modulators 312, 312′, signals having amplitudes related to the information be transferred. The information is usually different for each signal source. Pulse frequency modulators 312, 312′ are similar to modulators 212, 212′ and accordingly generate trains of pulses having fixed but different time durations with repetition rates related to the respective signals received from signal sources 310, 310′.

The train of pulses generated by modulator 312 is transmitted to fixed contact 322B of switch 322 while the train of pulses from modulator 312′ is transmitted to fixed contact 322B′ of switch 322′. During a recording operation, movable contacts 322A, 322A′ are respectively connected to fixed contacts 322B, 322B′, and accordingly, pulse shaper 314 receives pulses from modulator 312, while pulse shaper 314′ receives pulses from modulator 312′.

Pulse shapers 314, 314′, which are similar to pulse shapers 214, 214′, transmit standardized pulses to mixer 315 and also to filters 316, 316′. Filters 316, 316′, which are similar to filter 216, 216′, may be coupled to utilization devices to permit monitoring of the pulses being recorded. Mixer 315, which is similar to mixer 215, combines the pulse trains and transmits the combined pulse trains to the recording section of tape recorder 318, which is similar to recorder 18.

On playback, the reproduction section of tape recorder 318 transmits the combined pulse train to rectifiers 317, 317′ which are similar to rectifiers 217, 217′. Rectifiers 317, 317′ separate the pulses according to polarity and transmit trains of separated pulses respectively to amplifiers 319, 319′ which are similar to amplifiers 219, 219′. Since there is a playback operation in progress, movable contacts 322A, 322A′ are respectively engaged with fixed contacts 322C, 322C′. The reproduced trains of pulses are respectively received by pulse shapers 314, 314′.

The pulses are standardized and are therefore identical with the originally recorded pulses. The standardized reproduced pulse trains are respectively fed from pulse shapers 314, 314′ to filters 316, 316′. Said filters perform the above described functions of converting the pulse trains to signals having amplitudes related to the repetition rates of the pulses. It is noted that by employing the system of the instant invention, it is possible to have recording to playback speed ratios which are greater than, less than, or equal to one.

It is further noted that although the recording system of FIG. 3 has been described for a single channel tape recorder, it is possible to employ such a system for each channel of a multichannel tape recorder and therefore double the amount of information stored.

There are thus been described improved information transfer means which can transmit information represented by signals having frequencies extending down to and including the D.C. extreme. Such means is ideally suited for incorporation with magnetic tape recorders which have low frequency responses of only about thirty cycles. The use of the invention in such tape recorders minimizes the effect of wow and flutter since the signals may be modulated over wide limits without loss of linearity. Such wide range modulation is possible because the filtering of the signals does not require conventional tuned circuits that peak. In addition, the system herein may be combined in transfer systems which allow information signals from two sources to be combined in a single channel such as a communication link or a magnetic tape track.

Representative values of elements of the system described herein, include: resistor 32, 100,000 ohms; resistor 34, 10,000 ohms; resistor 36, 2,200 ohms; resistor 38, 68,000 ohms; resistor 40, 47,000 ohms; resistor 42, 1000 ohms; capacitor 44, .005 mfd.; capacitor 46, .04 mfd.; capacitor 47, .003 mfd.; resistor 49, 10,000 ohms; resistor 56, 2,200 ohms; resistor 58, 1,000 ohms; resistor 60, 50 ohms; capacitor 62, .00022 mfd.; resistor 64, 22,000 ohms; resistor 70, 4,700 ohms; resistor 72, 47,000 ohms; resistor 74, 100,000 ohms.

Capacitor 76, .005 mfd.; resistor 79, 47,000 ohms; resistor 80, 22,000 ohms; resistor 81, 5,500 ohms; resistor 82, 10,000 ohms; resistor 84, 39,000 ohms; resistor 86, 120,000 ohms; capacitor 94, .100 mfd.; capacitor 96, .250 mfd.; capacitor 98, .030 mfd.; capacitor 100, .008 mfd.; capacitor 102, .010 mfd.; capacitor 104, .0025 mfd.; resistor 108, 6,800 ohms; transistors 28, 30—CK722; transistors 52, 54—2N217; transistors 66, 68—2N269; and transistor 106—CK722. Thyrite 110, a non-linear resistor—G.E. 21/839G1.

As various changes might be made in the embodiments of the invention herein shown and described, without departing from the spirit thereof, it is understood that all matter herein shown or described shall be deemed illustrative and not by way of limitation except as set forth in the appended claims.

Having thus disclosed my invention, I claim as new and desire to protect by Letters Patent:

1. A transfer system for information represented by an input signal of varying amplitude comprising: a variable repetition rate pulse generating means, said generating means being modulated by said input signal to generate input pulses having a repetition rate which varies as a function of the amplitude of said input signal, means triggered by said input pulses to produce a first train of standardized pulses of constant duration and amplitude and having a repetition rate corresponding to that of said input pulses, means to convey said first train of standardized pulses through a medium which distorts said standardized pulses, means to detect said conveyed pulses to provide incoming pulses, means triggered by said incoming pulses to produce a second train of standardized pulses of constant amplitude and duration and having a repetition rate corresponding to that of said incoming pulses, and means to average said second train of standardized pulses to develop an output signal whose amplitude varies as a function of the repetition rate of the pulses in said second train.

2. A transfer system, as set forth in claim 1, wherein said means responsive to said input signal to produce input pulses is constituted by an asymmetrical multivibrator.

3. A transfer system, as set forth in claim 1, wherein said means to produce said first and second trains of standardized pulses comprises a trigger circuit responsive to the applied pulses, and a monostable pulse generator coupled to said trigger circuit to produce in response to each trigger pulse a single standardized pulse.

4. A transfer system, as set forth in claim 1, wherein said means to average said second train of standardized pulses comprises a passive resistance-capacitance filter network.

5. A transfer system for information represented by an input signal of varying amplitude comprising: means responsive to said input signal to generate input pulses having a repetition rate which varies as a function of the amplitude of said input signal, means triggered by said input pulses to produce a first train of standardized pulses of constant duration and amplitude and having a repetition rate corresponding to that of said input pulses, means to record said first train of standardized pulses, means to reproduce said recorded pulses to provide play-back pulses, means triggered by said play-back pulses to produce a second train of standardized pulses of constant amplitude and duration and having a repetition rate corresponding to that of said play-back pulses, and means to average said second train of standardized pulses to develop an output signal whose amplitude varies as a function of the repetition rate of the pulses in said second train.

6. A transfer system, as set forth in claim 5, wherein said means to record and to reproduce pulses is constituted by a magnetic tape system having a recording and play-back section.

7. A transfer system for information represented by an input signal of varying amplitude comprising: a pulse generator responsive to said input signal to produce input pulses having a repetition rate which varies as a function of the amplitude as said signal, a pulse shaper constituted by a trigger circuit and a multivibrator coupled thereto to produce standardized pulses of constant duration and amplitude with a repetition rate which corresponds to that of the pulses applied to said trigger circuit, a pulse storage system coupled to said standardized pulses having a recording section and a reproducing section, a passive network to average pulses applied thereto to produce an output signal whose amplitude varies as a function of the repetition rate of the pulses applied thereto, and selective switching means having a recording position in which said input pulses are applied to said pulse shaper to produce a first train of standardized pulses which are fed to the recording section of said storage system and having a reproducing position in which play-back pulses derived from said reproducing section are applied to said pulse shaper to produce a second train of standardized pulses which are fed to said passive network to produce an output signal.

8. A transfer system for information represented by an input signal of varying amplitude comprising: an asymmetrical pulse generator responsive to said input signal to produce input pulses having a repetition rate which is proportional to the amplitude of said signal, a pulse shaper constituted by a Schmitt trigger circuit and a monostable multivibrator coupled thereto to produce standardized pulses of constant duration and amplitude with a repetition rate corresponding to that of the pulses applied to said trigger circuit, a magnetic recording system having a recording section connected to receive said standardized pulses and a play-back section, a passive resistance-capacitance network to average pulses applied thereto, and selective switching means having a recording position in which said input pulses are applied to said pulse shaper to produce a first train of standardized pulses which are fed to said recording section, and having a reproducing position in which play-back pulses derived from said reproducing section are applied to said pulse shaper to produce a second train of standardized pulses which are fed to said network to produce an output signal whose amplitude varies in proportion to the repetition rate of said second train of pulses.

9. An information conversion system for recording and reproducing varying signals comprising a source of signals having amplitudes representative of the information being transferred, an astable asymmetrical multivibrator for generating pulses having substantially constant durations and a pulse repetition rate related to the amplitudes of the signals received from said signal source, a trigger circuit responsive to said astable asymmetrical multivibrator, said trigger circuit being activated when each received pulse exceeds a predetermined amplitude to generate a pulse of substantially constant amplitude for each pulse received, a monostable multivibrator responsive to said trigger circuit for generating pulses of substantially constant amplitude and duration, a magnetic tape storage system having recording and reproducing sections, said recording section being responsive to said monostable multivibrator for recording said pulses, means coupling said trigger circuit to said tape reproducing section, and reconversion means responsive to said monostable multivibrator for generating signals having amplitudes related to the repetition rate of the pulses generated by said monostable multivibrator.

10. The system of claim 9 wherein said reconversion means includes a filter and an emitter follower amplifier responsive to said filter, said emitter follower amplifier including a thyrite in the emitter circuit.

11. An information transfer system comprising first and second signal sources having variable amplitudes representing the information being transferred, first and second pulse generating means respectively responsive to said signal sources, said first and second pulse generating means generating pulses of substantially constant duration and pulse repetition rates representative of the amplitudes of the signals from said signal sources, first and second pulse shaping means respectively responsive to said first and second pulse generating means, said first pulse shaping means transmitting pulses of one polarity having a substantially constant amplitude and duration with a repetition rate equal to the repetition of received pulses, said second pulse shaping means transmitting pulses of opposite polarity having substantially constant amplitude and duration with a repetition rate equal to the repetition rate of received pulses, mixing means combining the signals from said first and second pulse shaping means, and a transmission link for transmitting a combined train of pulses from said mixing means, magnetic storage means having a recording section coupled to said transmission link and responsive to the output from said mixing means, and a reproducing section, said reproducing section having a single readout channel for the combined recorded signals, first and second signal separating means responsive to said single readout channel, said first signal separating means transmitting reproduced pulses of said one polarity, said second signal separating means transmitting reproduced pulses of said opposite polarity, means for causing said first pulse shaping means to be selectively responsive to said first signal separating means, means for causing said second pulse shaping means to be selectively responsive to said second signal separating means, and first and second signal utilization means respectively responsive to said first and second pulse shaping means for respectively converting the pulses from said first and second pulse shaping means to signals having amplitude related to the repetition rates of received pulses.

12. The system of claim 11 wherein each of said first and second utilization means includes a filter, an emitter follower amplifier responsive to said filter, and a thyrite in the emitter circuit of said amplifier.

13. The system of claim 11 wherein said first and second signal separating means include a rectifier, the rectifiers of said first and second signal separating means being oppositely polarized.

14. The system of claim 11 wherein the amplitude of the pulses transmitted by said first pulse shaping means is N times the amplitude of the pulses transmitted by said second pulse shaping means.

15. The system of claim 11 wherein the duration of the pulses transmitted by said second pulse shaping means is N times the duration of the pulses transmitted by said first pulse shaping means.

16. The system of claim 11 wherein the amplitude of the pulses transmitted from said first pulse shaping means is N times the amplitude of the pulses transmitted from said second pulse shaping means, while the duration of the pulses from said second pulse shaping means is N times the duration of the pulses from said first pulse shaping means.

17. The system of claim 16 wherein said second signal separating means includes amplifying means for amplifying of pulses separated by said second signal separating means.

References Cited by the Examiner

UNITED STATES PATENTS

| | | | |
|---|---|---|---|
| 2,418,268 | 4/47 | Lawson | 332—14 |
| 2,551,771 | 5/51 | Spielman | 328—58 X |
| 2,574,207 | 11/51 | Christian | 332—14 |
| 2,587,541 | 2/52 | Shenk | 332—16 |
| 2,592,572 | 4/52 | Jennings | 179—15.6 X |
| 2,632,847 | 3/53 | Reed | 328—57 |
| 2,653,237 | 9/53 | Johnstone et al. | 328—58 |
| 2,803,809 | 8/57 | Tilley | 340—15 |
| 2,839,727 | 6/58 | Lozier | 179—15.6 |
| 2,883,650 | 4/59 | Brockway | 340—167 X |
| 2,924,788 | 2/60 | Maurushat | 332—14 |
| 2,942,112 | 6/60 | Hearn | 340—18 |
| 2,991,415 | 7/61 | Pierson | 328—140 X |

NEIL C. READ, *Primary Examiner.*

EVERETT R. REYNOLDS, IRVING L. SRAGOW, *Examiners.*